United States Patent

Reinert, Sr.

[11] Patent Number: 6,098,531
[45] Date of Patent: Aug. 8, 2000

[54] SCRAP TIRE COLLECTION, VOLUME REDUCTION, AND TRANSPORTATION

[76] Inventor: Gary L. Reinert, Sr., 639 North Ave., Pittsburgh, Pa. 15209

[21] Appl. No.: 09/283,505

[22] Filed: Apr. 1, 1999

Related U.S. Application Data

[63] Continuation-in-part of application No. 08/778,178, Jan. 10, 1997, Pat. No. 5,890,425.
[60] Provisional application No. 60/009,892, Jan. 11, 1996.

[51] Int. Cl.⁷ .................. B30B 9/30; B30B 9/32
[52] U.S. Cl. .................. 100/39; 52/DIG. 9; 100/97; 100/100; 100/102; 100/137; 414/800; 428/2; 428/903.3
[58] Field of Search .................. 100/35, 39, 97, 100/100, 102, 137, 232, 299; 52/DIG. 9; 157/1.21, 2; 405/129; 414/111, 800; 428/2, 903.3

[56] References Cited

U.S. PATENT DOCUMENTS

| | | |
|---|---|---|
| 3,180,249 | 4/1965 | Patros . |
| 3,438,319 | 4/1969 | Raab . |
| 3,467,001 | 9/1969 | Balbi . |
| 3,557,683 | 1/1971 | Boyd . |
| 3,557,685 | 1/1971 | Schroering . |
| 3,583,164 | 6/1971 | Sherrill . |
| 3,913,850 | 10/1975 | Daniel . |
| 4,022,434 | 5/1977 | Moore . |
| 4,925,113 | 5/1990 | Wissman et al. . |
| 4,995,780 | 2/1991 | Dietzler . |
| 5,172,528 | 12/1992 | Clarke . |
| 5,375,775 | 12/1994 | Keller et al. . |
| 5,395,061 | 3/1995 | Merklinger . |
| 5,590,594 | 1/1997 | Pederson . |
| 5,890,425 | 4/1999 | Reinert . |

*Primary Examiner*—Stephen F. Gerrity
*Attorney, Agent, or Firm*—Douglas G. Glantz

[57] ABSTRACT

A method of handling scrap tires including providing a satellite tire collection enclosure constructed of baled tires and sized to receive scrap tires, collecting scrap tires inside the tire collection enclosure until the enclosure is at or near capacity, volume reducing the scrap tires by baling the scrap tires using a mobile tire baler having a baler and a boom on a mobile platform at a minimum of about 2,400 whole tires into bales having a minimum of about 20 whole tires and a maximum of about 150 tires in a bale to achieve a volume reduction of about 80 percent by volume, and transporting baled scrap tires to a home base, a recycling center, or directly to an end-user. In one aspect, a mobile tire baler includes a baler and a boom on a mobile platform, a cutter for over-size tires, and a crusher for tire rims.

12 Claims, 4 Drawing Sheets

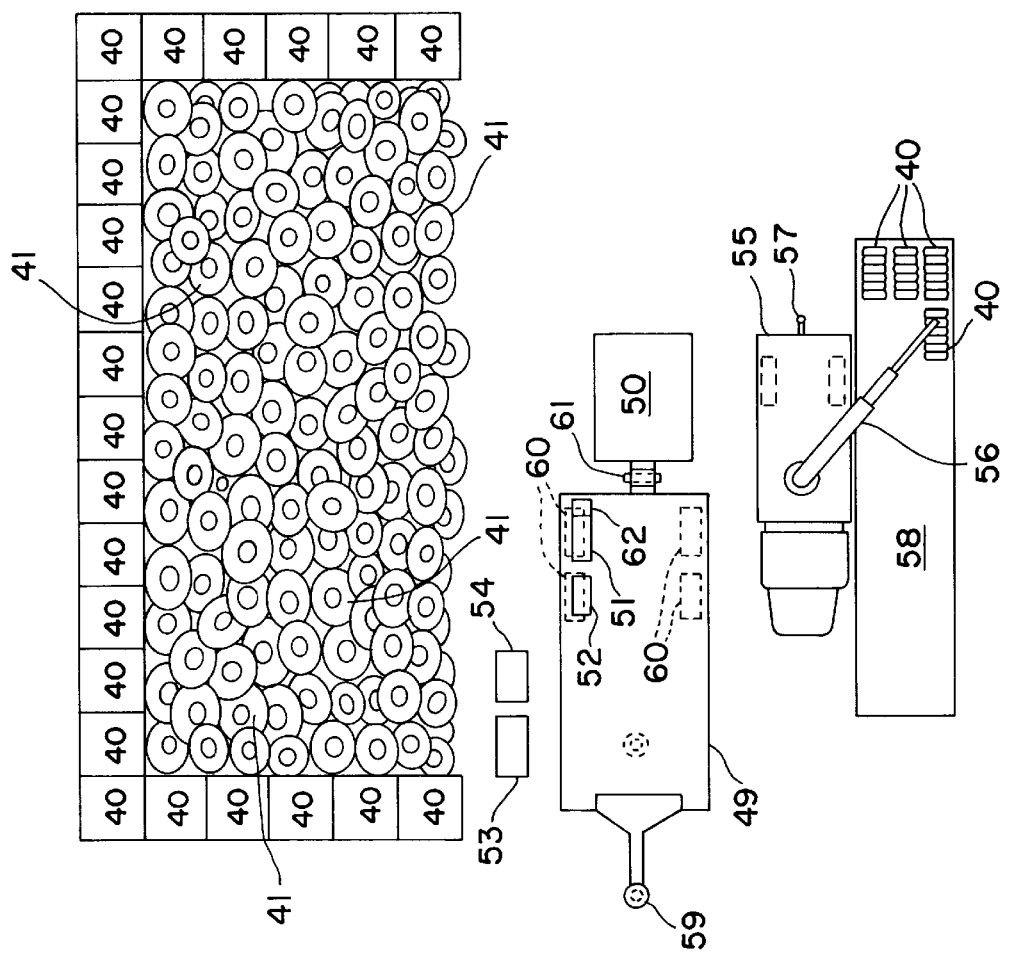

SCRAP TIRE COLLECTION, VOLUME REDUCTION, AND TRANSPORTATION

CROSS REFERENCE TO RELATED APPLICATIONS

This application is a continuation-in-part of U.S. application Ser. No. 08/778,178, filed Jan. 10, 1997, now U.S. Pat. No. 5,890,425, which claims the benefit of U.S. Provisional application Ser. No. 60/009,892, filed Jan. 11, 1996.

BACKGROUND OF THE INVENTION

1. Technical Field

This invention relates to the collection, volume reduction, and transportation of scrap tires.

2. Background

Scrap tire recyclers haul a tire collection trailer to a scrap tire generator site and park it there for so long as it takes for scrap tires to accumulate in an amount sufficient to fill the trailer with tires. A tractor is needed to haul the empty tire collection trailer from a scrap tire collection facility, to the scrap tire generator, and then to haul the loaded trailer from the scrap tire generator location to the tire collection facility. In situations where the volume of tires generated is significantly less than the amount needed to fill a tractor trailer, a stake body or box-van type vehicle is used instead of a trailer.

INTRODUCTION TO THE INVENTION

Through the years, enormous scrap tire piles have been growing in size throughout the nation. Scrap tires continue to be generated in large quantities every day. Some piles, with millions of scrap tires, occupy large pieces of land, creating potentially disastrous health and fire hazards. Such scrap piles also create an unpleasantly odorous and unsightly nuisance, in addition to the procreation of pests of all kinds.

It has been proven many times that large scrap tire piles are potential fire hazards. Scrap tire fires have been extremely difficult to extinguish, and they generate very dangerous toxic gases as well as soil and water table contaminating oils.

The Environmental Protection Agency has embarked on a major effort to reduce the amount of scrap tires being added to our environment every day. Their efforts also extend to finding solutions for the already existing scrap tire piles.

The Environmental Protection Agency favors the recycling of scrap tires. In other words, it favors the reutilization of the rubber and other materials, components of scrap tires, over the disposal of the tires in landfills.

As a result of the Environmental Protection Agency's efforts and its regulations, geared to control the handling and the disposal of scrap tires, a cottage industry started to evolve a few years ago. This industry provides various products with various applications.

Scrap tires are comminuted, i.e., reduced in size, into:
Scrap tire chips of various sizes,
Crumb rubber of many size groups,
Rubber powder, and
Steel and fibers.

Scrap tire chips of larger sizes are utilized at power plants, cement kilns, and other locations as tire-derived fuel, also known as, TDF, by way of example.

Scrap tire crumb rubber and powder are utilized in asphalt mixes. They also are used as fillers for plastic/rubber molded products, and to replace some of the natural rubber utilized in the production of new tires.

The scrap tire industry includes four major players:

The scrap tire generators, e.g., tire recappers and tire retailers;

Scrap tire collectors, which collect tires from the scrap tire generators and transport them to a collection facility, or to a scrap tire processor, or to an end user;

Scrap tire processors, which reduce whole tires by various means into chips, crumb rubber, rubber powder steel, and fibers; and Scrap tire product end users, which utilize scrap tire chips as tire derived fuel, crumb rubber, and rubber powder as fillers in various applications. The steel and the fibers also are recycled.

While the tire processing technology has advanced substantially, the collection/transportation side of the industry has remained behind. Scrap tire collection facilities deliver empty trailers to scrap tire generator sites. These empty trailers are staged at the generator sites until they are filled with scrap tires. One thousand to one thousand two hundred loosely packed scrap tires fill a trailer to its maximum capacity. A tractor is required for hauling the trailers to and from the collection facility.

When the tire collection trailer is full with scrap tires, it is hauled back from the scrap tire generator site to the scrap tire collection facility or to another location for further processing.

These scrap tire collection trailers are not just storage trailers. Because of the fact that they are hauled back and forth through the roadway system, they have to be roadworthy.

A truck driver with a tractor delivers an empty trailer to the scrap tire generator and returns with a full trailer, thereby requiring two trips. For every scrap tire generator, the conventional operation initially requires two trailers and four trips by the tractor. Subsequently, the driver with a tractor drops an empty trailer and then takes the full trailer back on the same round trip. Two trailers are required per each scrap tire generator for extended periods of time, generating unnecessary costs. These costs are generated because these trailers must be entirely road worthy, because of the fact that they are hauled back and forth through the roadway system and require insurance, license, equipment acquisition capital or lease costs, depreciation, maintenance, and operating costs for two road-worthy trailers.

The scrap tire collector then provides for the processing of the tires by different methods of comminution, i.e., size reduction, through shredding, granulating, and other means, or disposal of the tires at a landfill.

Transportation costs are a major component of the total costs in the scrap tire collection business. It is apparent that substantial transportation costs, as well as excessive handling costs are incurred, in addition to the large capital expenditures related to the acquisition of a great number of trailers and tractors. Of course, these could be leased as well, which is an expenditure nevertheless.

All of these costs are substantial because they are derived from the limited amount of scrap tires that can be transported by the scrap tire collection trailers.

In my many years of collecting and processing scrap tires, I have discovered the following drawbacks with the conventional method.

One drawback of the conventional method is that it is inefficient.

Another drawback of the conventional method is having to deliver an empty tire collection trailer to the generating facility and that it must remain there while it is being manually loaded with loosely arranged scrap tires over an extended period of time.

Yet another drawback of the conventional method is that the full trailer must be hauled to the collection facility with only 1,000 to 1,250 loosely arranged scrap tires which utilizes less than half of the combination weight capacity of the vehicle.

Still another drawback of the conventional method is the switching of empty trailers with full trailers which represents a time consuming, repetitious process.

A further drawback of the conventional method is that the full trailer then must be unloaded at the collection facility.

Yet a further drawback of the conventional method is that the loading of scrap tires onto route trucks is done manually.

Still a further drawback of the conventional method is that it requires excessive capital or lease expenditures.

Still another drawback of the conventional method is that there are excessive transportation and maintenance cost generated.

Yet another drawback is the excessive manpower and overhead costs created by the conventional method.

A further drawback is that loose scrap tires present a significant health and fire hazard.

It is an object of the present invention to provide a novel and more efficient scrap tire collection process.

It is an object of this invention to provide a novel scrap tire collection process, which eliminates or reduces the problems associated with conventional scrap tire collection methods.

It is yet another object of the present invention to provide a novel scrap tire collection process, which eliminates or reduces the time and manpower necessary to manually load loose scrap tires associated with the conventional scrap tire collection method.

It is yet another object of this invention to provide a novel scrap tire collection process, which increases the number of tires that can be transported at one time.

It is still another object of the present invention to provide a novel scrap tire collection process, which eliminates the time and effort involved in trailer switches.

It is a further object of the present invention to provide a novel scrap tire collection process, which eliminates the time and effort involved in unloading route trucks and trailers associated with the conventional scrap tire collection method.

It is yet a further object of the present invention to provide a novel scrap tire collection process to reduce equipment capital and maintenance costs in the collection of scrap tires.

It is still a further object of the present invention to provide a novel scrap tire collection process to reduce transportation costs in the collection of scrap tires.

It is still another object of this invention to provide a novel scrap tire collection process to reduce manpower and labor costs in the collection of scrap tires and the distribution to end users.

Yet another object of this invention is to provide a novel scrap tire collection process that reduces the health and fire hazards associated with the conventional method.

A further object of this invention is to provide a novel scrap tire collection process, which achieves one or more of the objects and advantages set forth above.

These and other objects of the present invention will become apparent to those skilled in the art from a careful review of the detailed description, which follows.

SUMMARY OF THE INVENTION

The present invention provides a method of handling scrap tires including a satellite tire collection enclosure, in one aspect constructed of baled tires, sized to receive at least 2400 scrap tires, accumulating scrap tires inside the tire collection enclosure until the enclosure is at or near capacity, volume reducing the scrap tires by baling the scrap tires using a mobile tire baler, and a boom, into bales having a minimum of about 20 whole tires and a maximum of about 150 tires in a bale, and transporting baled scrap tires to a home base, a recycling facility, or directly to an end user. In one aspect, a mobile tire baler includes a baler and a boom on a mobile platform, a cutter for over-size tires, and a crusher for tire rims. The present invention also provides compactor trucks to collect scrap tires from low volume generators.

BRIEF DESCRIPTION OF THE DRAWINGS

FIG. 1 shows a central collection center and various satellite accumulation centers, with storage enclosures. Also shown are various scrap tire generators, all in accordance with the methods of the present invention.

FIG. 2 is a schematic plan view showing a detail of the enclosure of FIG. 1. FIG. 2 also shows various types of equipment utilized by the methods of the present invention.

DETAILED DESCRIPTION

Figure 1:
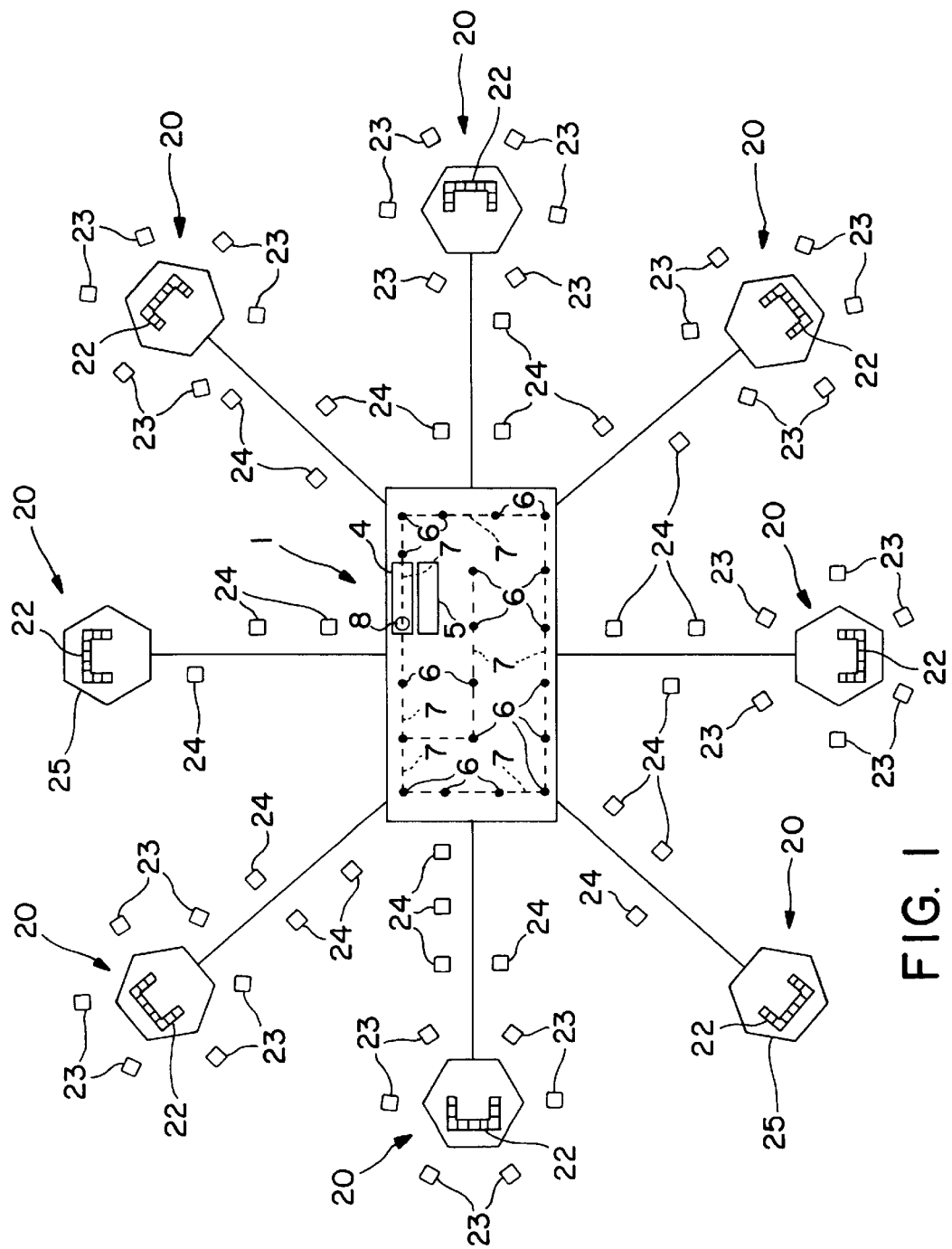
FIG. 1 is a schematic plan view of the scrap tire collection system of the present invention.

In accordance with the present invention, FIG. 1 shows a home base of a scrap tire collector 1, with a field office 4, a truck scale 5, and a smoke and heat detection system having smoke and heat sensors 6 connected by line 7 to automatic dialing equipment 8.

FIG. 1 also shows a number of satellites 20. In each satellite 20, there is an enclosure 22.

Referring now to FIG. 1, the scrap tire collector 1 works with scrap tire generators 23, 24, and 25. Scrap tire generators 23 and 24 are located along routes which are within a fifty-mile radius around the home base of the scrap tire collector 1. A single large volume generator 25 comprises a single satellite 20.

Single large volume generators 25 provide a single satellite 20. Other satellites 20 accumulate scrap tires 41 from various smaller volume scrap tire generators 23,24. Scrap tire generators 23 are always around a satellite 20; while scrap tire generators 24 are along or in close proximity to the route to and from a satellite 20.

Referring now to FIG. 2, each satellite 20 has an enclosure 22 made of bales 40. The enclosure 22 constructed of bales 40 is made of scrap tires 41 or other materials. The enclosure 22 is sized to allow a substantial amount of scrap tires 41 to be accumulated for eventual on-site baling as shown in FIG. 2.

Figure 3:
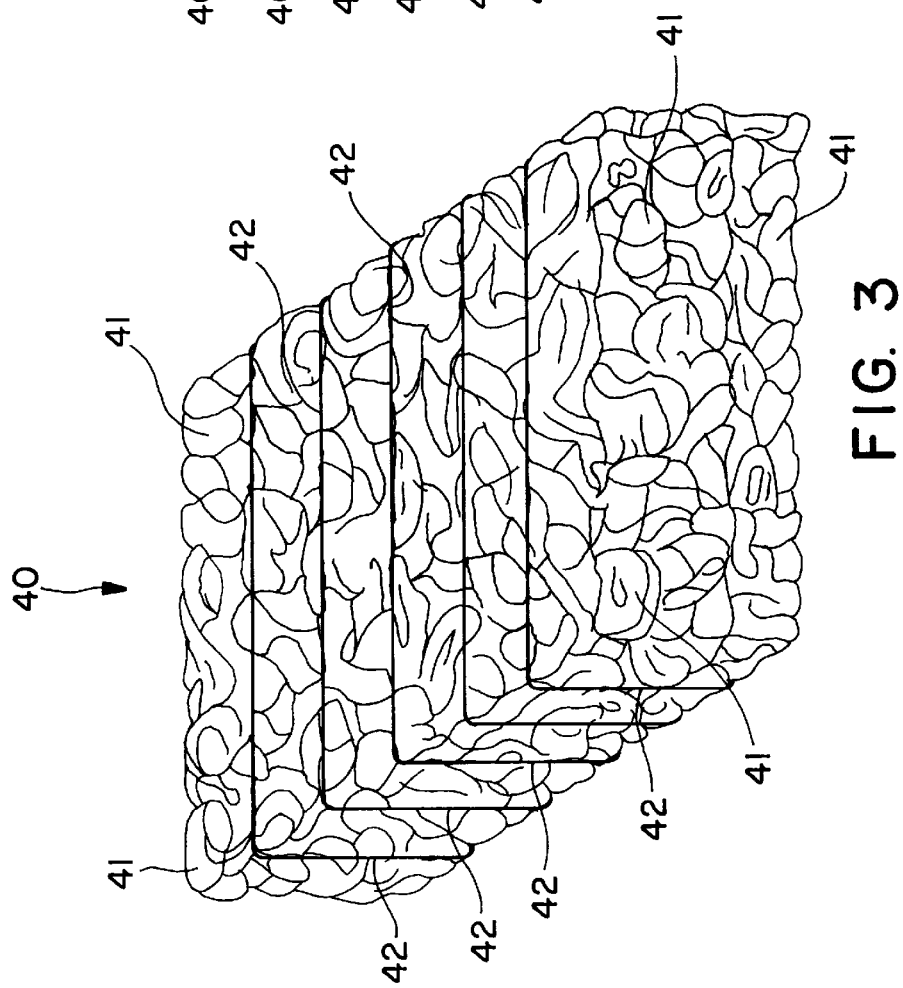
FIG. 3 is a perspective view of one type of scrap tire bale of the present invention.

Referring now to FIG. 3, the bales 40 made of scrap tires 41 are shown in detail.

The method of the present invention for handling scrap tires, includes providing a satellite tire collection enclosure sized to receive at least about 2400 scrap tires, collecting scrap tires inside the tire collection enclosure until the enclosure is at or near capacity, volume reducing the scrap tires by baling the scrap tires into bales having a minimum of about 20 whole tires and a maximum of about 150 tires in a bale, transporting baled scrap tires to a home base, a recycling center, or directly to an end-user. At least twenty tires per bale are needed to make for an efficient process of collecting and distributing the scrap tires. At 150 tires per bale, the bale weighs about 3,000 pounds. At tires over 150 tires per bale, the weight of the bale makes for difficult handling.

By the method of the present invention, the scrap tire collector 1 provides for the baling and transportation of all tire bales 40, based on a contractual agreement for a period of 3 to 5 years, by way of an example.

At the location of the enclosure 22, tires 41 are accumulated inside the enclosure 22, until such time that the enclosure is at capacity, preferably approximately 2,400 tires, then a baling crew is assigned to bale the tires.

Each satellite 20 as shown in FIG. 1 has an enclosure 22 built-in. FIG. 2 shows a substantial quantity of scrap tires 41 inside the enclosure. Enclosures 22 are made of baled tires or other suitable materials.

FIG. 2 shows a trailer 49 used to transport a baler 50, i.e., a baling machine 50, a tire cutter 53, and a tire de-rimmer 54. Tire cutter 53 is utilized for cutting large size scrap tires, e.g., truck tires, by the way of an example. De-rimmer 54 is used occasionally to separate a tire rim from the tire itself.

Trailer 49 also carries a hydraulic pump 62 and an engine 51 to operate pump 62. Pump 62 provides hydraulics and switchable controls to baler 50 as well as to tire cutter 53 and to tire de-rimmer 54, respectively switchable. Baler 50 bales scrap tires 41 into bales of any shape like bales 40 and 45 of FIG. 3 and FIG. 4, respectively.

Baler 50 preferably flips over from trailer 49 onto its operating position by means of joint 61 and crane 56.

FIG. 2 shows a conventional crane truck 55 having a boom 56 and a hitch 57 used to hitch onto hitch 59 of trailer 40, in order to haul trailer 40 to a satellite 20. Trailer 58 is utilized to haul bales 40 to home base 1 or any other destination, e.g., an end user, for instance.

Referring now to FIG. 3, bale 40 of the present invention is shown. Bales 40 consist of a number of scrap tires 41, e.g., one hundred scrap tires, by the way of an example. Scrap tires 41 are substantially compressed and then tied together by heavy gauge steel wires 42 or by other types of banding or tying devices.

Figure 4:
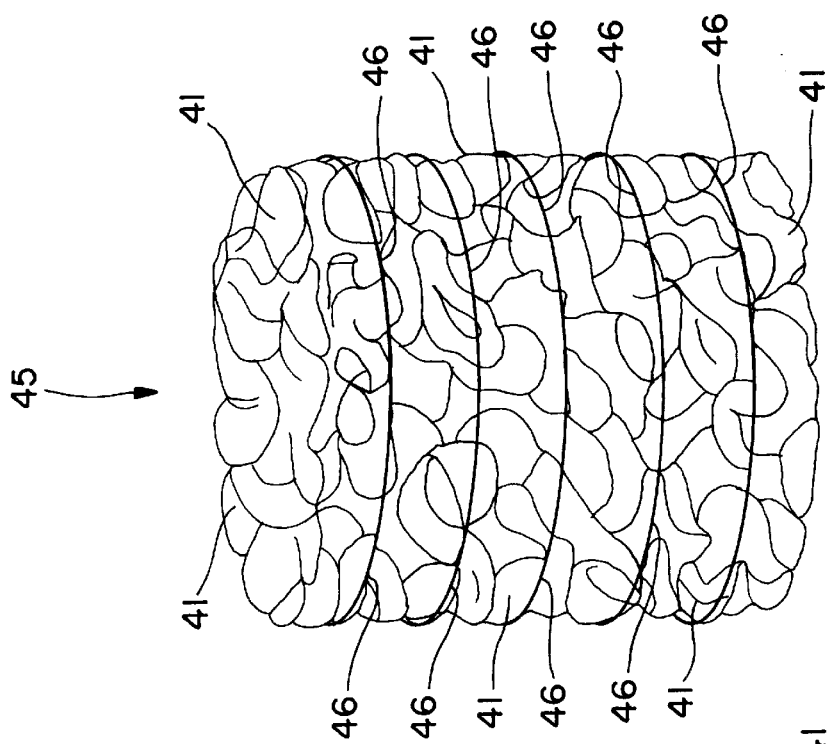
FIG. 4 is a perspective view of another type of scrap tire bale of the present invention.

FIG. 4 shows a different shape of bale. Bales 45 of the present invention are of cylindrical shape. Bales 45 consist of a number of scrap tires 41, heavily compressed and then tied together by heavy gauge steel wires 46 or by other types of banding or tying devices.

The baling process involves placing whole tires in conventional baling machine 50 and compressing them into a greatly compacted bale 40, e.g., compacting 100 scrap tires 41 into a single bale 40 of approximately five feet by five feet by two and one half feet. The baling process reduces the volume of the scrap tires by approximately 80%. This baling process, part of the method of the present invention, provides a reduction of various costs, e.g., storage costs, transportation and related costs, and labor costs.

The present invention eliminates the need for hauling loose tires by means of a conventional trailer/container, manual loading of the trailer with loose tires, unloading loose tires at the final destination, and the four trips required by the tractor by the conventional method. All work can be completed with one round trip by the method of the present invention.

Baling of the scrap tires allows for transporting a greater quantity of scrap tires by truck, rail, or barge.

Satellites 20 are situated in areas of high tire concentrations and located within an approximate 50 miles radius surrounding a home base 1 or end-user. These satellites 20 are located within approximately 25 miles of scrap tire generators 23,24, or at the site of a single high volume scarp tire generator 25. These high volume scrap tire generators 25 can accumulate approximately 5,000 to 20,000 scrap tires on-site within a bale enclosure 22.

A satellite 20 is located at a landfill, at a plot of land, or at a location where tires 41 are generated. At these satellites 20, the scrap tires 41 from many scrap tire generators are accumulated.

Figure 5:
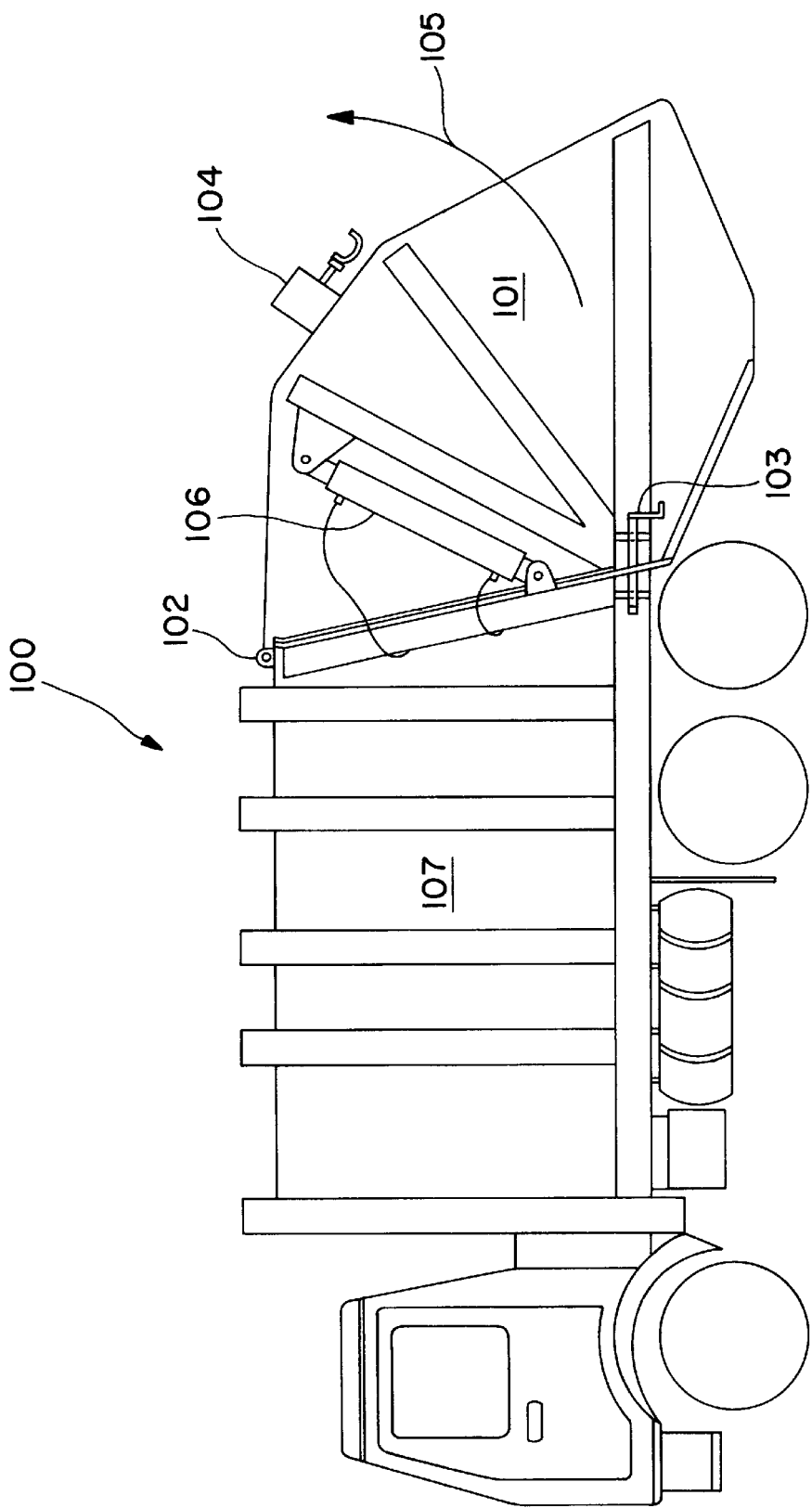
FIG. 5 is an elevation view of a compactor truck utilized by the methods of the present invention.

Referring now to FIG. 5, a compactor truck 100 is shown. In order to collect tires 41 from low volume scrap tire generators 23,24, the present invention provides for the use of a compactor truck 100 that compresses tires 41 as opposed to manually arranging and stacking them. By the method of the present invention, collecting tires from low volume scrap tire generators 23,24, from locations where the placement of an enclosure 22 is not practical or from locations where the tire storage capacity for the site is less than 2400 tires 41, a compactor type truck 100 is utilized. A compactor truck 100 requires only an operator as opposed to an operator and helpers. Compactor truck 100 is of front, rear, or side loader design. Compactor truck 100 is equipped with electric or hydraulic lifting devise 104. These lifting devices 104 are hooks, arms, booms, forks, or other apparatus designed to lift or assist in the lifting of large tires, quantities of tires, or bins and/or dumpsters containing scrap tires. Compactor trucks 100 that collect scrap tires from low volume generators 23,24 have a capacity, for instance, of 800 to 1400 scrap tires 41 and, after collecting and compacting a full load of scrap tires from several low volume generators 23, 24, transport the compacted tires to a satellite 20 or home base 1. The compactor truck 100 that collects from low volume generators has mechanical device 106 for the opening of the compacted tire storage chamber 107 by lifting chamber 101 by means of hydraulic cylinders 106 around pivot 102 as represented by arrows 105 and other mechanical devices, not shown, for the unloading or discharging of the compacted tires.

Scrap tires collected by the compactor truck 100 are hauled to a point for baling, e.g., at the satellite 20. The scrap tires 41 are discharged from the compactor truck 100 at the satellite 20 or the home base 1 by means of other mechanical devices, not shown, on the compactor truck, for the purpose of baling by means of baler 50 as shown in FIG. 2.

The scrap tire collector provides for the on-site baling, as shown in FIG. 2, of the scrap tires 41 from each scrap tire generator 23, 24, and 25, at a satellite 20.

Continuing to refer to FIG. 2, the scrap tire collector loads the processed bales 40 onto a trailer 58, utilizing a boom truck 55 or any other lifting equipment 56 and transports the bales 40 to the home base 1 or directly to the end-user.

Forty-eight foot trailer 56 can be loaded with approximately twenty-four bales 40 which is equivalent to approximately twenty four hundred scrap tires, as opposed to the 1,000 to 1,200 loosely arranged scrap tires that can be hauled when using the conventional method. By the conventional method, two forty-eight foot trailers are required to transport the same amount of scrap tires that are transported by a single forty-eight foot trailer 56 by the method of the present invention.

At the home base 1, the bales are unloaded by means of a front loader equipped with forks or other apparatus that may handle the weight of a bale. Baled tires may weigh anywhere from 300 to 3,000 pounds.

In accordance with the methods of the present invention, home bases 1 are located within approximately a 50 mile radius of any satellite 20 and are capable of storing or staging large quantities of baled scrap tires. Home bases 1 are barge and/or railroad served, will have three to five acres of level area and have a field office 5 for the purpose of maintaining records, a truck scale 4, and loading and unloading equipment.

Home base 1 will have its baled storage areas monitored by heat and smoke sensors 6. All sensors 6 are connecting 7 to automatic dialing devices 8, which are programmed to alert emergency response services.

By baling the scrap tires, a substantial volume reduction is achieved, e.g., such as by approximately 80 percent by volume, which allows for transporting a greater number of scrap tires by means of trucks, rail, or barge.

From the satellite, bales may be taken directly to the nearest rail or barge site and shipped to end-users or staged at a home base. Alternatively, the bales are taken to the nearest river site and shipped by river barge to the end users.

If the owner/supplier has a satellite location, the scrap tire collector then provides for the processing of scrap tires at the scrap tire supplier location. This type of scrap tire supplier can stock up to about 10,000 to 20,000 scrap tires on-site within a simple bale enclosure.

Preferably, the scrap tire collection enclosures are constructed from baled tires. Alternatively, a fenced-in area may be provided at the customer's request and may involve an estimated cost of about $1,000.00 to $1,500.00. Such a cost is only a one time cost, and does not involve costs for a tractor, for insurance, or maintenance for fixing trailers up to be road-worthy. Such cost is a one time investment and does not involve the cost of a tractor, insurance, or maintenance for typical repairs and maintenance required to maintain road-worthy trailers.

The scrap tire collector then provides for removing and transporting the baled tires. When the scrap whole tires have been baled, the tractor trailer can be loaded with baled tires, but now the tractor trailer can haul 2400 tires, as compared to the 1,200 tires, which is about twice as many because of the volume reduction techniques utilized for the processing of scrap tires. Subsequently, the trailer may be hauled back to the home base or to the processing center or end-user.

Tires are collected, processed, and transported to the home base which can be located at a barge or railroad siding for the purpose of transporting in large volume. The processed tires are loaded on a barge for shipping on the river to the destination or end users or simply staged for future off-site use.

A novel baler truck is provided having a baler mounted on the truck, a boom, a portable cutter for cutting oversize tires, and a portable crusher for crushing tire rims. Some tires, because of different, inconsistent sizes, must be cut in half or in quarters to go into the baler. Tires having rims on them require a crushing unit operation for crushing the rims. The truck requires only one hydraulic system in combination with a switchable control selectable as to the unit operation on the novel truck. Otherwise, e.g., in prior art operations before the novel baler truck of the present invention, each independent baling, cutting, or crushing operation would come with its own motor, a pump, and hydraulic system. The novel baler truck of the present invention provides all unit operations on one truck because the baling unit operation has the largest capacity of hydraulic systems, more than the cutting and crushing unit operations system.

The single hydraulic system on the novel baler truck of the present invention is controllably switchable from the baler to the crusher, to the cutter, or to the boom. All unit operations thereby use the same hydraulic system for all unit operations on the novel baler truck of the present invention and for the process of the present invention to operate to reduce problems associated with used tires, including, reducing fire hazard by reducing the availability of oxygen for combustion. Chips of tires have a high flammability risk not similarly associated with the tire bales of the present invention.

The tire novel baler can take 20 to 150 tires, preferably 100 to 110 tires, and put them into a five feet by five feet by three feet six inches compact bale. The compact bale is so compact as to prevent water from entering the bale or tires in the bale. Loose tires have a severe problem with water laying in them. Insects invade the loose tires having such water present. The tire bale thereby provides for a significant reduction in insects or rodents.

The scrap tire collector provides for the processing of the scrap tires in accordance with the present invention by contracting with the scrap tire owner/supplier, e.g., in obtaining a guarantee from this type of scrap tire owner/supplier to come to the scrap tire site and pick-up all scrap tires, on a routine, long term basis.

The scrap tire collector provides for the processing of the scrap tires in accordance with the present invention by using a flatbed truck with a baler and a boom crane mounted on it. The scrap tire collector provides for the processing of the scrap tires in accordance with the present invention by taking the flat-bed truck with the baler to the scrap tire supplier's site and baling all the stocked tires at the scrap tire supplier's site.

The scrap tire collector provides for the processing of the scrap tires in accordance with the present invention by loading the bales on the flatbed truck, by means of the on-board boom crane.

The scrap tire collector then drives the flatbed truck with the bales to a central point, where a forty feet long trailer is located. This forty feet long trailer is centrally located, within a five to ten mile radius of the farthest scrap tire stockpile suppliers. The scrap tire collector then provides for the processing of the scrap tires in accordance with the present invention by transferring the bales to the forty feet long trailer. When the trailer is full, the scrap tire collector provides for the processing of the scrap tires in accordance with the present invention by further by transporting to the end user site final destination by truck, rail, or river barge.

In one aspect, the baled tires of the present invention ane useful for filling river holes, i.e., holes, voids, or depressions in river beds.

Although the invention has been illustrated by the preceding detailed description, it is not intended to be construed as being limited to the specific preferred embodiments employed therein.

Modifications, changes, and improvements to the preferred forms of the invention herein disclosed, described, and illustrated may occur to those skilled in the art who come to understand the principles and precepts thereof. Accordingly, the scope of the patent to be issued hereon should not be limited to the particular embodiments of the invention set forth herein, but rather should be defined by the advance by which the invention has promoted the art.

Whereas particular embodiments of the invention have been described herein above, for purposes of illustration, it will be evident to those skilled in the art that numerous variations of the details may be made without departing from the invention as defined in the appended claims.

What is claimed is:

1. A method of handling scrap tires, comprising:
   (a) providing a satellite tire collection enclosure sized to receive scrap tires;
   (b) collecting scrap tires inside said tire collection enclosure until said enclosure is at or near capacity;
   (c) volume reducing said scrap tires by baling said scrap tires into bales having a minimum of about 20 whole tires and a maximum of about 150 tires in a bale;
   (d) transporting baled scrap tires to a home base, a recycling center, or directly to an end-user.

2. A method of handling scrap tires as set forth in claim 1, wherein said tire collection enclosure is constructed of baled tires.

3. A method of handling scrap tires as set forth in claim 1, wherein said tire collection enclosure is a fenced-in area.

4. A method of handling scrap tires as set forth in claim 1, further comprising:
   (e) unloading said baled scrap tires at said home base, recycling center, or end-user by means of a front loader equipped with forks for handling the weight of at least one bale of about 2,000 to 3,000 pounds.

5. A method of handling scrap tires as set forth in claim 1, wherein said volume reducing said scrap tires by baling said scrap tires comprises a volume reduction of about 80 percent by volume.

6. A method of handling scrap tires as set forth in claim 1, wherein said transporting baled scrap tires comprises transporting by means of truck, rail, or barge.

7. A method of handling scrap tires as set forth in claim 1, wherein said satellite tire collection enclosure is sized to receive at least about 10,000 scrap tires.

8. A method of handling scrap tires as set forth in claim 1, wherein said home base comprises a barge or railroad siding or both for the purpose of transporting in volume.

9. A method of handling scrap tires as set forth in claim 1, wherein said collecting scrap tires comprises a scrap tire collector contracting with a scrap tire owner or supplier and obtaining a guarantee from said scrap tire owner or supplier to collect and pick-up scrap tires, on a routine, long term basis.

10. A method of handling scrap tires as set forth in claim 1, comprising using a mobile tire baler having a baler and a boom on a mobile platform.

11. A method of handling scrap tires as set forth in claim 10, wherein said mobile tire baler has a portable cutter on said mobile platform for cutting oversize tires and a portable crusher for crushing tire rims.

12. A method of handling scrap tires, comprising:
   (a) providing a satellite tire collection enclosure constructed of baled tires and sized to receive at least about 2400 scrap tires;
   (b) collecting scrap tires inside said tire collection enclosure until said enclosure is at or near capacity;
   (c) volume reducing said scrap tires by baling said scrap tires using a mobile tire baler having a baler and a boom on a mobile platform into bales having a minimum of about 20 whole tires and a maximum of about 150 tires in a bale to achieve a volume reduction of about 80 percent by volume;
   (d) transporting baled scrap tires to a home base, a recycling center, or directly to an end-user; and
   (e) unloading said baled scrap tires at said home base, recycling center, or end-user by means of a front loader equipped with forks for handling the weight of a bale of about 2,000 to 3,000 pounds.

* * * * *